United States Patent
Pan

(10) Patent No.: US 9,444,733 B2
(45) Date of Patent: *Sep. 13, 2016

(54) PROXIES FOR PSEUDO-WIRE ALLOCATION AND DISTRIBUTION

(71) Applicant: Brixham Solutions Ltd., Tortola (VG)

(72) Inventor: Ping Pan, San Jose, CA (US)

(73) Assignee: Brixham Solutions Ltd. (VG)

( * ) Notice: Subject to any disclaimer, the term of this patent is extended or adjusted under 35 U.S.C. 154(b) by 0 days.

This patent is subject to a terminal disclaimer.

(21) Appl. No.: 14/864,689

(22) Filed: Sep. 24, 2015

(65) Prior Publication Data

US 2016/0021003 A1 Jan. 21, 2016

Related U.S. Application Data

(63) Continuation of application No. 11/486,432, filed on Jul. 12, 2006, now Pat. No. 9,160,658.

(60) Provisional application No. 60/698,893, filed on Jul. 12, 2005.

(51) Int. Cl.
| | |
|---|---|
| H04L 12/721 | (2013.01) |
| H04L 12/723 | (2013.01) |
| H04L 12/701 | (2013.01) |
| H04L 12/911 | (2013.01) |
| H04L 12/46 | (2006.01) |
| H04L 12/851 | (2013.01) |

(52) U.S. Cl.
CPC ........... *H04L 45/68* (2013.01); *H04L 12/4633* (2013.01); *H04L 45/00* (2013.01); *H04L 45/50* (2013.01); *H04L 45/507* (2013.01); *H04L 47/24* (2013.01); *H04L 47/825* (2013.01)

(58) Field of Classification Search
None
See application file for complete search history.

(56) References Cited

U.S. PATENT DOCUMENTS

| | | |
|---|---|---|
| 5,920,705 A | 7/1999 | Lyon et al. |
| 6,167,051 A | 12/2000 | Nagami et al. |
| 6,347,088 B1 | 2/2002 | Katou et al. |
| 6,374,303 B1 | 4/2002 | Armitage et al. |
| 6,430,184 B1 | 8/2002 | Robins et al. |
| 6,546,427 B1 | 4/2003 | Ehrlich |
| 6,574,477 B1 | 6/2003 | Rathunde |
| 6,621,793 B2 | 9/2003 | Widegren et al. |
| 6,665,273 B1 | 12/2003 | Goguen et al. |
| 6,680,943 B1 | 1/2004 | Gibson et al. |
| 6,738,354 B1 | 5/2004 | Smith et al. |

(Continued)

OTHER PUBLICATIONS

Martini, Segmented Pseudo Wire, Network Working Group, 2006, pp. 1-32.*

(Continued)

*Primary Examiner* — Christopher Crutchfield
(74) *Attorney, Agent, or Firm* — Patents and Licensing LLC; Daniel W. Juffernbruch; John G. Fijolek

(57) ABSTRACT

Communicating is disclosed. A first communication associated with a first mechanism for configuring a pseudo-wire is received. The first communication is transformed into a second communication, where the second communication is associated with a second mechanism for configuring a pseudo-wire. The second communication is transmitted, where a pseudo-wire that is configured using the second communication is associated with (1) a first node that is configured to support the first mechanism and (2) a second node that is configured to support the second mechanism.

20 Claims, 5 Drawing Sheets

(56) References Cited

U.S. PATENT DOCUMENTS

| | | | |
|---|---|---|---|
| 6,751,684 | B2 | 6/2004 | Owen et al. |
| 6,813,271 | B1 | 11/2004 | Cable |
| 6,845,389 | B1 | 1/2005 | Sen et al. |
| 6,985,488 | B2 | 1/2006 | Pan et al. |
| 7,050,396 | B1 | 5/2006 | Cohen et al. |
| 7,200,104 | B2 | 4/2007 | Saleh et al. |
| 7,436,782 | B2 | 10/2008 | Ngo et al. |
| 7,697,528 | B2 | 4/2010 | Parry |
| 2001/0021175 | A1 | 9/2001 | Haverinen et al. |
| 2001/0023453 | A1 | 9/2001 | Sundqvist |
| 2002/0112072 | A1 | 8/2002 | Jain et al. |
| 2002/0141393 | A1 | 10/2002 | Eriksson |
| 2002/0146026 | A1 | 10/2002 | Unitt et al. |
| 2003/0002482 | A1 | 1/2003 | Kubler et al. |
| 2003/0039237 | A1 | 2/2003 | Forslow |
| 2003/0117950 | A1 | 6/2003 | Huang |
| 2004/0105459 | A1 | 6/2004 | Mannam |
| 2004/0114595 | A1 | 6/2004 | Doukai et al. |
| 2004/0133692 | A1 | 7/2004 | Blanchet et al. |
| 2004/0151159 | A1 | 8/2004 | Xu et al. |
| 2004/0156313 | A1 | 8/2004 | Hofmeister |
| 2004/0174865 | A1 | 9/2004 | O'Neill |
| 2004/0252717 | A1 | 12/2004 | Solomon et al. |
| 2005/0018605 | A1 | 1/2005 | Foote et al. |
| 2005/0044262 | A1 | 2/2005 | Luo |
| 2005/0147104 | A1* | 7/2005 | Ould-Brahim ...... H04L 12/4608 370/395.5 |
| 2005/0220148 | A1 | 10/2005 | DelRegno et al. |
| 2005/0237927 | A1 | 10/2005 | Kano et al. |
| 2005/0286558 | A1* | 12/2005 | Ould-Brahim ...... H04L 12/4633 370/467 |
| 2006/0002423 | A1* | 1/2006 | Rembert ................. H04L 45/50 370/466 |
| 2006/0018252 | A1 | 1/2006 | Sridhar |
| 2006/0046658 | A1 | 3/2006 | Cruz |
| 2006/0047851 | A1 | 3/2006 | Voit |
| 2006/0090008 | A1 | 4/2006 | Guichard et al. |
| 2006/0146832 | A1 | 7/2006 | Rampal |
| 2006/0187856 | A1 | 8/2006 | Booth et al. |
| 2006/0190570 | A1 | 8/2006 | Booth, III et al. |
| 2006/0233167 | A1 | 10/2006 | McAllister |
| 2007/0053366 | A1 | 3/2007 | Booth, III |
| 2007/0127479 | A1 | 6/2007 | Sinicrope |
| 2007/0206607 | A1 | 9/2007 | Chapman |
| 2008/0031129 | A1 | 2/2008 | Arseneault et al. |
| 2008/0253367 | A1 | 10/2008 | Ould-Brahim |
| 2009/0161544 | A1 | 6/2009 | Kelly et al. |

OTHER PUBLICATIONS

Afferton et al., Ethernet Transport over Wide Area Networks, Packet-Aware Transport for Metro Networks, IEEE Communications Magazine, Mar. 2004.

Martini et al., Pseudowire Setup and Maintenance using the Label Distribution Protocol (LDP), Network Working Group, Apr. 2006.

Anderson et al., LDP Specification, Network Working Group, Jan. 2001.

Bryant et al., Pseudo Wire Emulation Edge-to-Edge (PWE3) Architecture, Network Working Group, Mar. 2005.

Martini et al., Encapsulation Methods for Transport of Ethernet over MPLS Networks, Network Working Group, Apr. 2006.

Martini et al., Encapsulation Methods for Transport of Frame Relay over MPLS Networks, Network Working Group, Feb. 2006.

Vainshtein et al., Structure—Agnostic Time Division Multiplexing (TDM)over Packet (SAtoP), Network Working Group, Jun. 2006.

Metz et al., Pseusdowire Attachment Identifiers for Aggregation and VPN Autodiscovery, PWE3 Working Group, Feb. 25, 2006.

Martini et al., Dynamic Placement of Multi Segment Pseudo Wires, PWE3 Working Group, Jun. 2006.

Office Action dated Nov. 24, 2008 for U.S. Appl. No. 11/486,389, 24 pages.

Office Action dated Nov. 19, 2008 for U.S. Appl. No. 11/486,432.

Martini et al., "Pseudowire Setup and Maintenance using LDP", Network Working Group, Mar. 2005.

Office Action dated Jul. 7, 2009 for U.S. Appl. No. 11/486,389, 37 pages.

Theimer et al. "Requirements for OAM Functionality in MPLS", Oct. 1999, watersprings.

Office Action dated Aug. 31, 2010 for U.S. Appl. No. 11/486,389, 17 pages.

Harry Newton, "Newton's Telecom Dictionary", 23rd updated and Expanded Edition, Flatiron Publishing, New York, Mar. 2007.

Office Action dated Aug. 31, 2010 for U.S. Appl. No. 11/486,432.

Braden et al., Integrated Services in the Internet Architecture: an overview, Networking Working Group, Jun. 1994.

Blake et al., An Architecture for Differentiated Services, Network Working Group, Dec. 1998.

Shah et al., Internal Draft., ARP Meditation for IP Networking of Layer 2 VPN, Jul. 2007.

Martini et al., Internet Draft Segmented Pseudo Wire, Network Working Group, Jul. 2007, 36 pages.

Pan et al., Internet Draft, Pseudo Wire Protection, Jul. 2006.

Rosen et al., Internet Draft, PWE3 Congestion Control Framework, Network Working Group, Mar. 2004.

Rosen et al., BGP/MPLS IP Virtual Private Networks (VPNs), Feb. 2006.

Pan, Ping, Internet Draft, Dry-Martini: Supporting Pseudo-wires in Sub-IP Access Networks, Network Working Group, Jul. 2005.

McPherson et al., Pseudowire Emulation Edge to Edge (PWE3) Jun. 13, 2007, http://www.ietf.org/html.charters/pwe3-carter.html.

Vasseur et al., Path Computation Element (pce), May 9, 2007, http://www.ietf.org/html.charters/pce-charter.html.

Office Action dated Mar. 1, 2011 for U.S. Appl. No. 11/486,389, 36 pages.

Office Action dated Jul. 8, 2011 for U.S. Appl. No. 11/486,389, 33 pages.

Non Final Office Action dated Sep. 9, 2013 for U.S. Appl. No. 11/486,389, 41 pages.

Non Final Office Action dated Sep. 24, 2013 for U.S. Appl. No. 11/486,432, 34 pages.

Notice of Allowance mailed Mar. 17, 2014 for U.S. Appl. No. 11/486,389, 48 pages.

Final Office Action dated Apr. 30, 2014 for U.S. Appl. No. 11/486,432, 30 pages.

Martini et al., "Segmented Pseudo Wire", Network Working Group, Mar. 2006, published online at [http://tools.ietf.org/html/draft-ietf-pwe3-segmented-pw-02], retrieved Dec. 1, 2010, 32 pages.

Ould-Brahim."Multi-Segment Pseudo-Wires" U.S. Appl. No. 60/711,861, filed Aug. 26, 2005. (Non-Provisional Application later published as US20080253367 on Oct. 16, 2008).

Notice of Allowance mailed May 28, 2015 for U.S. Appl. No. 11/486,432, 44 pages.

* cited by examiner

PROXIES FOR PSEUDO-WIRE ALLOCATION AND DISTRIBUTION

CROSS REFERENCE TO OTHER APPLICATIONS

This application is a continuation of, and claims priority to, U.S. patent application Ser. No. 11/486,432, filed on Jul. 12, 2006, and entitled "PROXIES FOR PSEUDO-WIRE ALLOCATION AND DISTRIBUTION," (now U.S. Pat. No. 9,160,658) which claims priority to U.S. Provisional Patent Application No. 60/698,893, filed on Jul. 12, 2005, and entitled "SUPPORTING PSEUDO-WIRES IN SUB-IP ACCESS NETWORKS." The entireties of these related applications are hereby incorporated herein by reference.

BACKGROUND OF THE INVENTION

Aggregating multiple flows into a shared data trunk requires packet flow ID encapsulation. In one technique, packets belonging to a user flow are encapsulated with unique information that makes the flow unique throughout a network. Each of these encapsulated flows is referred to as a pseudo-wire. In some cases, multiple pseudo-wires are simultaneously operating in a network.

There are many techniques available to set up a pseudo-wire between two end nodes. However, in some networks some devices are configured to support one technology while other devices are configured to support another technology. In some cases, these technologies may be incompatible and an error message may be returned when a device receives a message associated with another technology. It would be desirable to develop techniques to set up pseudo-wires in networks where different technologies are supported in different parts of the network. It would be also desirable if these techniques could conform to existing network standards or specifications and/or some currently deployed devices could continue to be used, for example without requiring upgrades or reconfiguration.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique for communicating is disclosed. A first communication associated with a first mechanism for configuring a pseudo-wire is received. In some embodiments, a first communication is received from an access device. The first communication is transformed into a second communication, where the second communication is associated with a second mechanism for configuring a pseudo-wire. In some embodiments, transforming includes concatenating and/or a function, $F(x)$. In some embodiments, the second communication includes information that is reversibly generated. In some embodiments, a second communication is transmitted to another aggregation device.

Figure 1:
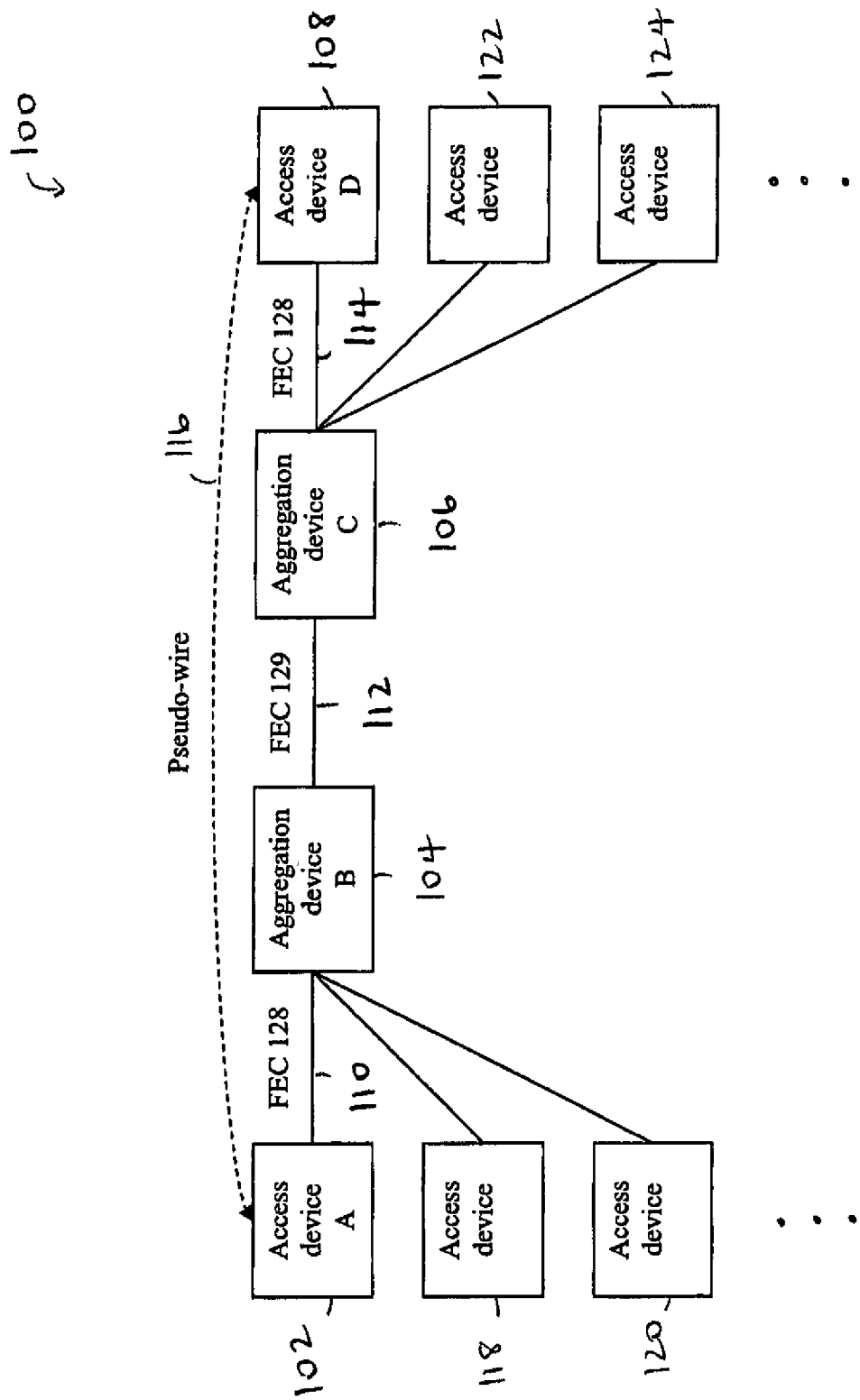
FIG. 1 is a system diagram illustrating an embodiment of a network in which a pseudo-wire is set up.

FIG. 1 is a system diagram illustrating an embodiment of a network in which a pseudo-wire is set up. In the example shown, network 100 comprises of multiple access devices and aggregation devices. As traffic flows in the upstream direction (e.g., from an access device to an aggregation device), flows are groomed and aggregated with other flows and are transmitted along higher bandwidth connections. For example, aggregation device 104 grooms and aggregates flows from access devices 102, 118, and 120.

In some cases, access devices are associated with a particular geographical area, such as a residential neighborhood. For example, in some applications, access devices are located at the local office of a cable company or telephone company and provide access for remote devices in the neighborhood of the local office. Some examples of access devices are DSL Access Multiplexers (DSLAM) associated with DSL, Cable Modem Termination Systems (CMTS) associated with cable broadband, Gateway GPRS Support Nodes (GGSN) associated with wireless networks, Customer Premises Equipment/Multi-service SONET/SDH Provisioning Platforms (CPE/MSPP) associated with business leased lines, Optical Line Termination (OLT) that is responsible for connecting Passive Optical Networks (PON), which includes Broadband PON (BPON) and Ethernet PON (EPON), etc.

In some embodiments, a connection between an access device and an aggregation device is a lambda (photonic) connection, Synchronous Optical Network/Synchronous Digital Hierarchy (SONET/SDH) cross-connect, Asynchronous Transfer Mode (ATM)/frame relay circuit, or Ethernet Virtual LAN (VLAN) connection.

Aggregation devices groom and aggregate traffic from associated access devices. Some examples of an aggregation device include an aggregation switch or router, multi-service edge device, etc. In some networks, a single aggregation device is connected to dozens to hundreds of access devices. An aggregation device may service access devices in a particular region (e.g., a city or metropolitan area) and is sometimes referred to as a metropolitan aggregator. In some embodiments, an aggregation device comprises multiple systems.

Pseudo-wire 116 operates between access device 102 and access device 108, which are referred to as the end nodes of pseudo-wire 116. A pseudo-wire is an encapsulated flow of traffic between two end points with any number of intermediate nodes between the end points. In some cases, intermediate nodes are devices via which a pseudo-wire (i.e., an encapsulated flow of traffic) traverses or is routed from one end node of the pseudo-wire to another. In this example, the nodes associated with pseudo-wire 116 are access devices 102 and 108 and aggregation device 104 and 106. Each pseudo-wire includes two unidirectional paths. For example, pseudo-wire 116 includes a path from access device 102 to access device 108 and another path from access device 108 to access device 102.

Devices in network 100 are configured to support different types of technologies to set up a pseudo-wire. Access devices 102 and 108 are configured to support Forwarding Equivalence Class (FEC) 128 and use FEC 128 specified communications to communicate with other devices to set up a pseudo-wire. Aggregation devices 104 and 106 are configured to support FEC 129.

FEC 128 is described in Section 5.2 of the Request for Comments (RFC) 4447 developed by the Network Working Group of the Internet Engineering Task Force (IETF). In FEC 128, an entity at one end node (e.g., access device 102) sets up the path in one direction (e.g., the path from access device 102 to access device 108). The path in the other direction (e.g., from access device 108 to access device 102) is set up by an entity at the other end node (e.g., access device 108). The messaging protocol used by FEC 128 is Label Distribution Protocol (LDP).

FEC 129 is described in Section 5.3 of RFC 4447. FEC 129 is a "one-armed" technique where a single entity at one of the end nodes can set up a pseudo-wire. For example, an entity at access device 102 (if access device 102 was configured to support FEC 129) can use FEC 129 to establish a path from access device 102 to access device 108 (if access device 108 was configured to supported FEC 129). The path in the other direction (e.g., from access device 108 to access device 102) may be set up using FEC 129 without requiring another entity to be at the remote end node. FEC 129 uses LDP as its messaging protocol.

FEC 128 and FEC 129 vary in their requirements for pseudo-wire definition and/or identifiers. FEC 128 does not require a pseudo-wire to be globally defined. FEC 129 requires pseudo-wires to be globally defined. An identifier associated with a pseudo-wire in FEC 129 may be a globally unique identifier.

In other systems that include non-homogeneous technologies to set up a pseudo-wire (e.g., some devices support FEC 128 and some devices support FEC 129), it may be impossible to establish pseudo-wire 116 between access devices 102 and 108. In other systems for example, an aggregation device that is configured to support FEC 129 may return an error message to an access device that attempts to set up a pseudo-wire using FEC 128. In some cases, it may be undesirable or infeasible to swap out or reconfigure devices (such as aggregation devices and/or access devices) so that the same technology is uniformly supported across a network. For example, the logistics and/or cost of replacing or reconfiguring so many devices may be unattractive.

In this example, aggregation device 104 and 106 are configured to act as proxies for associated access devices 102 and 108, respectively, so that pseudo-wire 116 can be set up even though the devices are configured to use different technologies. In some cases, an aggregation device acts as a proxy for more than one access device. For example, aggregation device 104 may act as a proxy for access device 118 in addition to access device 102. To support proxying, aggregation devices 104 and 106 transform FEC 128 related communications to FEC 129 related communications and vice versa as appropriate. For example, aggregation device 104 may receive an FEC 128 communication from access device 102. Rather than returning an error message to access device 102, aggregation device 104 may generate a FEC 129 communication based on the received FEC 128 communication and transmit the FEC 129 communication to aggregation device 106. Aggregation device 106 may receive the FEC 129 message, convert the message back to an FEC 128 message, and pass it to access device 108. In some embodiments, the message passed from aggregation device 106 to access device 108 is identical to the message that is passed from access device 102 to aggregation device 104.

In some embodiments, a given aggregation device acts as a proxy for only a subset of access devices coupled to it. For example, if access device 120 is configured to support FEC 129, aggregation device 104 performs proxy related services for access device 102 but not necessarily for access device 120. For example, access device 120 may communicate with aggregation device 104 using FEC 129 related communications and no proxying is needed. In some embodiments, one end node is proxied and the other end node is not proxied. For example, if a pseudo-wire has access devices 120 and 108 as end nodes where access device 120 is configured to support FEC 129 and access device 108 is configured to support FEC 128, in some embodiments aggregation device 104 does not act as a proxy for access device 120 but aggregation device 106 does act as a proxy for access device 108.

In some embodiments, communications that are passed amongst access device 102 and 108 and aggregation devices 104 and 106 comply with a network standard or specification. In some embodiments, the communications include no extraneous or proprietary fields. For example, an FEC 129 communication passed between aggregation devices 104 and 106 may comply with RFC 4447, Section 5.3 that describes FEC 129. This may enable aggregation devices included in network 100 that do not have proxying capabilities to be able to properly process an FEC 129 message generated by aggregation device 104 and/or 106.

In some embodiments, no changes are required to be made to access device 102 and/or 108 in order for aggregation device 104 and 106 to act as proxies in setting up pseudo-wire 116. This may be desirable for network providers, since existing access devices that are already deployed may continue to be used without requiring new equipment and/or software. In some embodiments, proxy services or functionality (e.g., performed by aggregation devices 104 and/or 106) are transparent to access devices 102 and/or 108. For example, access devices 102 and/or 108 may be unaware that some portion of network 100 is not configured to support FEC 128. In some embodiments, access devices 102 and 108 are unaware that aggregation devices 104 and 106 are acting as proxies.

Some other systems that attempt to provide interoperability between devices configured to support different technologies may not be as desirable as network 100 described above. For example, some systems use pseudo-wires switching described in the document entitled, "Segmented Pseudo Wires" developed by the PWE3 Working Group of the IETF. In segmented pseudo-wires, multiple pseudo-wires are set up to implement or otherwise emulate a single pseudo-wire. For example, using segmented pseudo-wires, there may be one pseudo-wire between access device 102 and aggregation device 104, another between aggregation devices 104 and 106, and another between aggregation device 106 and access device 108 rather than a single pseudo-wire extending from access device 102 to access device 108. However, segmented pseudo-wires may be undesirable since there is no single control plane that extends from end node to end node. As a result, some management and/or control capabilities or features may be more difficult or impossible to support when segmented pseudo-wires are used.

In some embodiments, a technique in addition to or in place of FEC 128 and/or FEC 129 is used to set up a pseudo-wire. In some embodiments, a pseudo-wire is set up manually by a user at an access device. For example, connection 110 and/or 114 may be associated with manual set up instead of FEC 128. In another example, connection 112 is associated with FEC 128 and at least one of connections 110 and 114 is associated with FEC 129. Some of the examples described herein are associated with the example of network 100. In some embodiments, these example techniques are modified as appropriate depending upon the technologies supported by the devices in a network.

In some embodiments, a network may include additional components. For example, a network may include a core device that is coupled to an aggregation device. A core device may provide access to a high bandwidth backbone. In some embodiments, a pseudo-wire may pass through a device that is neither an access device nor an aggregation device (e.g., a core device). In some embodiments, an end node of a pseudo-wire is not an access device. In some embodiments, the example techniques described herein are modified or augmented as appropriate depending upon the particular devices associated with a pseudo-wire.

Figure 2:
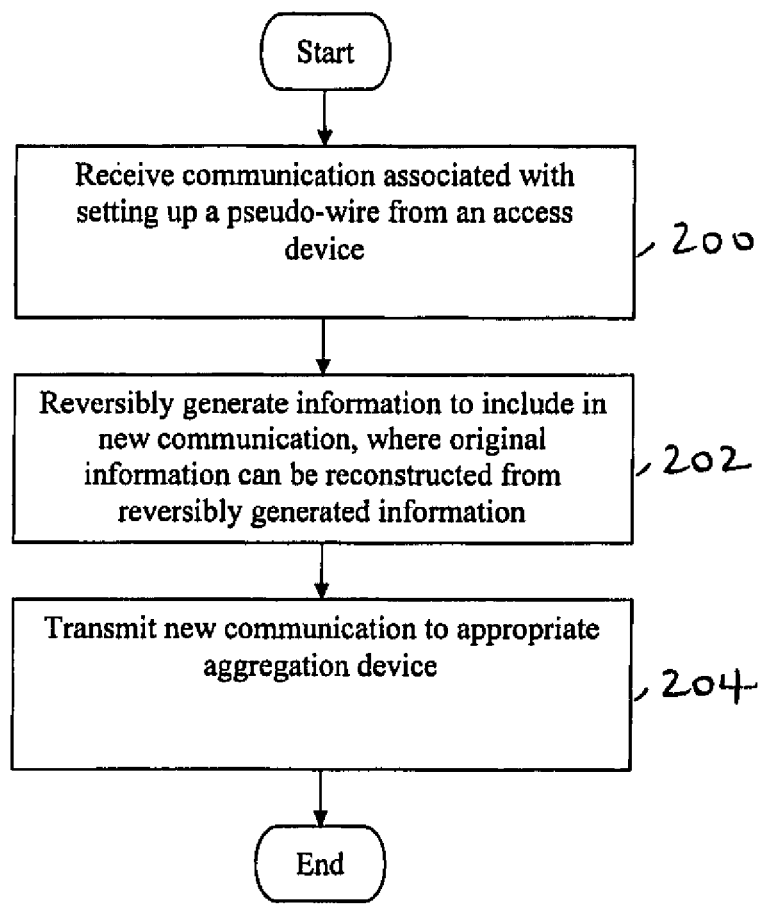
FIG. 2 is a flowchart illustrating an embodiment of a process for transforming a communication received from an access device that is being proxied.

FIG. 2 is a flowchart illustrating an embodiment of a process for transforming a communication received from an access device that is being proxied. In the example shown, the process is performed by an aggregation device that is configured to support a different technology than the access device from which a communication is received. Referring to the example of FIG. 1, aggregation device 104 in some embodiments performs this processing on communications received from access device 102. Correspondingly, in some embodiments aggregation device 106 uses the example processing for communications received from access device 108.

At 200, a communication associated with setting up a pseudo-wire is received from an access device. For example, a communication received at 200 may be a message received by aggregation device 104 from access device 102, or a message received by aggregation device 106 from access device 108. In some embodiments, a received communication is an FEC 128 communication if the associated access device is configured to support FEC 128. In some embodiments, the received communication is associated with FEC 129, is manually generated, and/or is an LDP message.

At 202, information to include in a new communication is reversibly generated, where the original information can be reconstructed from the reversibly generated information. By reversibly generating information, it may be possible to use existing message formats that do not have proprietary fields and/or conform to a networking protocol, standard or specification. For example, if a received message is associated with FEC 128 and a new message is associated with FEC 129, the values of the fields in the new FEC 129 message may be reversibly generated so that the original information (e.g., the FEC 128 information) can be reconstructed by a recipient. No additional and/or proprietary fields need to be added in order for the original information to be obtained or otherwise generated at a recipient. Some embodiments of this are described in further detail below.

A new communication is transmitted to an appropriate aggregation device at 204. Any appropriate technique may be used to determine which aggregation device to transmit a new communication to. In some embodiments, a communication is transmitted to an aggregation device associated with a target access device. In some embodiments, a communication is transmitted at 204 to all aggregation devices. Each aggregation device may determine whether to process and/or forward the communication or ignore it.

Figure 3:
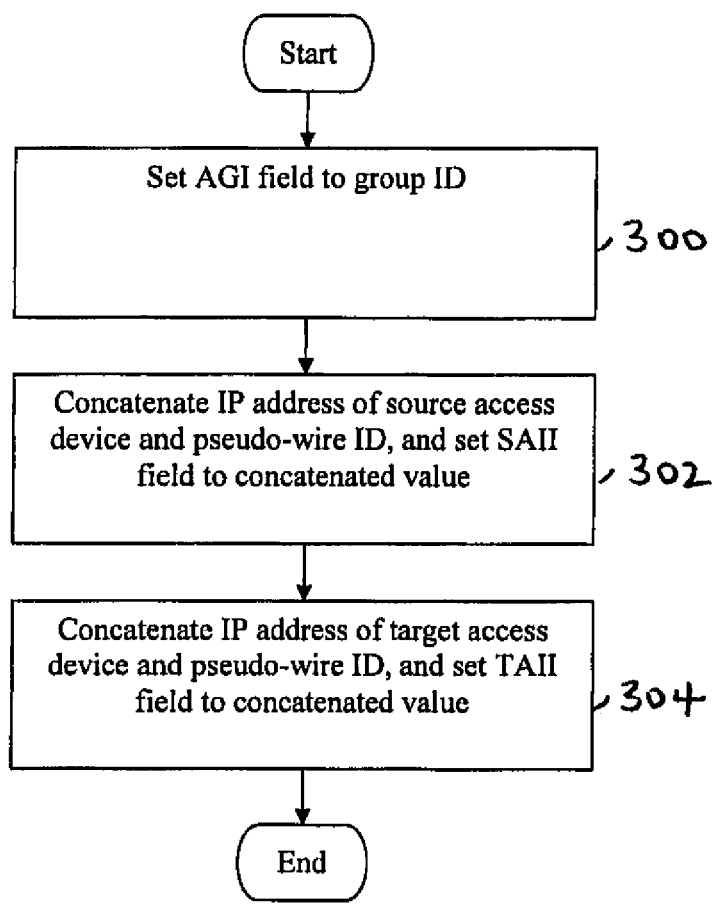
FIG. 3 is a flowchart illustrating an embodiment of a process for reversibly generating information based on information received from an access device being proxied.

FIG. 3 is a flowchart illustrating an embodiment of a process for reversibly generating information based on information received from an access device being proxied. In some embodiments, the example process is performed by an aggregation device and/or is used at 202 of the previous figure to reversibly generate information for a new communication. In this example, an aggregation device performing the method is configured to support FEC 129 and the access device being proxied is configured to support FEC 128. The example process may be modified as appropriate if an access device and/or an aggregation device supports another technology besides FEC 128 and/or FEC 129.

FEC 128 related communications include the fields group ID and pseudo-wire ID. FEC 129 related communications include the fields Attachment Group Identifier (AGI), Source Attachment Individual Identifier (SAID, and Target Attachment Individual Identifier (TAII). In this example, each FEC 129 field is reversibly generated using the values of one or more FEC 128 fields.

At 300, the AGI field is set to group ID. At 302, the Internet Protocol (IP) address of the source access device and the pseudo-wire ID are concatenated, and the SAII field is set to the concatenated value. The source access device may be the end node from which a communication associated with setting up a pseudo-wire originated. For example, if a communication is received from access device 102, the IP address of access device 102 is used at 302. At 304, the IP address of the target access device and the pseudo-wire ID are concatenated, and the TAII field is set to the concatenated value. The target access device may be the end node for which a communication is targeted. For example, if a communication originated from access device 102, the target of that communication is access device 108 and the IP address of access device 108 is used at 304.

The information generated by the above process may satisfy the requirement of FEC 129 that each pseudo-wire be globally defined. For example, even if another pseudo-wire were to be set up between the same end nodes (and thus the IP addresses of the source access device and target access device would be the same), the group ID and/or pseudo-wire ID would be different and at least one of the AGI, SAIL or TAII may be different. Each pseudo-wire may be globally defined even though some pseudo-wires may have the same end nodes.

In some applications, the described process for reversibly generating new information is attractive because processing intensive techniques (e.g., multiplying or dividing) are not used. However, any technique (including processing intensive techniques) may be used so long as information is reversibly generated where the original information is able to be reconstructed using the reversibly generated information. In some embodiments, some transformation or function is used. For example, the function F(x) may be used to generate a new value y that is included in a new communication. A recipient may use the inverse function F'(y) to reconstruct the original information x. A function F(x) may include Boolean operations, arithmetic operations, linear/non-linear transformations, etc. In some embodiments, an access device or other end node does not have an IP address. Alternative information such as a name, locator, or other identifier is used in some embodiments instead of IP address.

Figure 4:
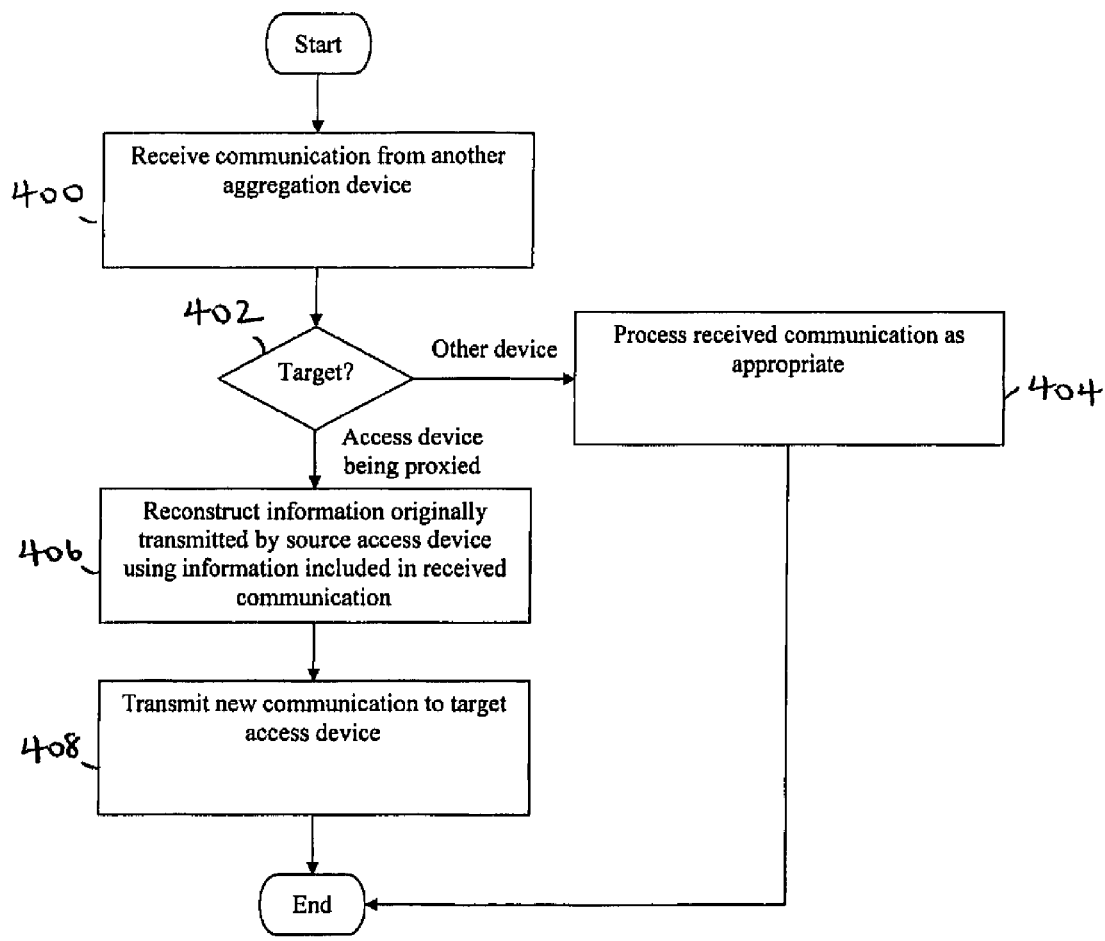
FIG. 4 is a flowchart illustrating an embodiment of a process for processing a communication received from an aggregation device.

FIG. 4 is a flowchart illustrating an embodiment of a process for processing a communication received from an aggregation device. In the example shown, the process is performed by an aggregation device where communications targeted for multiple devices are received. Some targets are access devices that an aggregation device is acting as a proxy for, and received communications are transformed for those access devices being proxied.

At 400, a communication is received from another aggregation device. For example, if aggregation device 106 is performing the process, the communication may be received from aggregation device 104. The target of a received communication is decided at 402. For example, if the received communication is an FEC 129 communication, the TAII field may be examined to determine the target. If the target is not an access device being proxied, a received communication is processed as appropriate at 404. For example, in some embodiments a received communication is transmitted to a target without modification.

If the target is an access device being proxied, information originally transmitted by a source access device is reconstructed using information included in a received communication at 406. For example, if the received communication is an FEC 129 related communication and the access device being proxied supports FEC 128, the values of fields in the FEC 129 communication may be used to reconstruct FEC 128 related information. Some embodiments are described in further detail below. At 408, a new communication is transmitted to the target access device. A new communication may include information reconstructed at 406.

Figure 5:
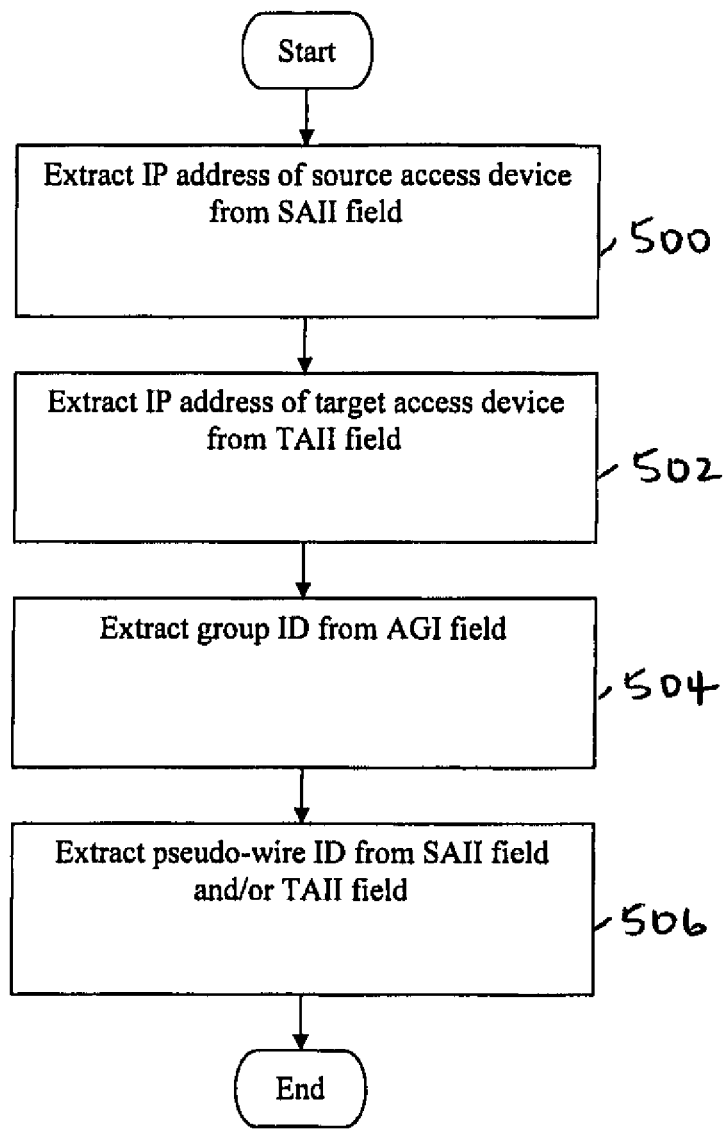
FIG. 5 is a flowchart illustrating an embodiment of a process for reconstructing information.

FIG. 5 is a flowchart illustrating an embodiment of a process for reconstructing information. In the example shown, an access device being proxied is configured to support FEC 128, and FEC 129 related information (e.g., included in an FEC 129 communication) is used to reconstruct FEC 128 information. The example process corresponds to the example of FIG. 3. In some embodiments, the illustrated process is modified, for example if different technologies are used and/or another process besides the example of FIG. 3 is used to reversibly generate information.

At 500, an IP address of a source access device is extracted from an SAII field. For example, a received FEC 129 communication will have SAII=<source access device IP address><pseudo-wire ID> and the first portion of the SAII field contains the IP address of the source access device.

At 502, an IP address of a target access device is extracted from a TAII field. For example, a received FEC 129 communication will have TAII=<target access device IP address><pseudo-wire ID> and the first portion of the TAII field contains the IP address of the target.

At 504, group ID is extracted from an AGI field. For example, a received FEC 129 communication will have AGI=<group ID>.

At 506, pseudo-wire ID is extracted from a SAII field and/or a TAII field. In some embodiments, a pseudo-wire ID is extracted from both the SAII field and TAII field. The values are compared and if the values do not match an error is declared. Otherwise, the value is used as the pseudo-wire ID. In some embodiments, one of the two fields is selected and the selected field is used to obtain the pseudo-wire ID.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A node device, comprising:
a processor configured to, in response to a determination that a first message associated with a first pseudo-wire configuration protocol does not conform to a second pseudo-wire configuration protocol, transform the first message to a second message associated with the second pseudo-wire configuration protocol, wherein the second message comprises a source attachment individual identifier field having a value equal to concatenated data from an internet protocol address field and a pseudo-wire identifier field of the first message; and
a transmitter configured to send the second message to another node device.

2. The node device of claim 1, further comprising a receiver configured to receive the first message from a first access device.

3. The node device of claim 2, wherein the other node device is a proxy device for a second access device.

4. The node device of claim 3, wherein the first message comprises information configured to facilitate establishment of a pseudo-wire between the first access device and the second access device via the node device.

5. The node device of claim 4, wherein the pseudo-wire is associated with a single control plane.

6. The node device of claim 4, wherein at least one of the first message or the second message is configured to facilitate the establishment of the pseudo-wire from the second access device through an intermediate node device to the first access device.

7. The node device of claim 1, wherein a first set of data fields of the second message comprises at least a first field corresponding to a first attribute of the second pseudo-wire configuration protocol set to a value of at least a second field of a second set of data fields of the first message corresponding to a second attribute of the first pseudo-wire configuration protocol.

8. The node device of claim 7, wherein the first field comprises an attachment group identifier field of the second message, and the second field is a group identification field of the first message.

9. The node device of claim 1, wherein at least one of the first pseudo-wire configuration protocol or the second pseudo-wire configuration protocol comprises at least one of forwarding equivalent class 128, forwarding equivalent class 129, or a manual pseudo-wire configuration protocol.

10. The node device of claim 1, wherein the second message comprises at least one of an attachment group identifier or a target attachment individual identifier.

11. A method, comprising:
   transforming, by a first device comprising at least one processor, a first message conforming to a first pseudo-wire configuration protocol to yield a second message conforming to a second pseudo-wire configuration protocol, wherein the transforming comprises at least:
      concatenating data from an internet protocol address field and a pseudo-wire identifier field of the first message to yield concatenated data, and
      setting a value of a source attachment individual identifier field of the second message equal to the concatenated data; and
   sending, by the first device, the second message to a second device.

12. The method of claim 11, further comprising receiving, by the first device, the first message from a first access device that supports the first pseudo-wire configuration protocol.

13. The method of claim 12, wherein the sending comprises sending the second message to, as the second device, a proxy device for a second access device.

14. The method of claim 13, further comprising establishing a pseudo-wire between the first access device and the second access device via the first device based on the second message.

15. The method of claim 11, wherein the transforming comprises setting at least a first field of a first set of data fields of the second message to a value of at least a second field of a second set of data fields of the first message, the first field corresponds to a first attribute of the first pseudo-wire configuration protocol, and the second field corresponds to a second attribute of the second pseudo-wire configuration protocol.

16. The method of claim 15 wherein the first field comprises an attachment group identifier field of the second message, and the second field is a group identification field of the first message.

17. A computer-readable storage device having stored thereon instructions that, in response to execution, cause a node device to perform operations, comprising:
   transforming a first communication of a first pseudo-wire configuration protocol to a second communication of a second pseudo-wire configuration protocol, wherein the transforming comprises at least:
      concatenating a source network address of a first access device specified in the first communication and a pseudo-wire identifier specified in the first communication resulting in a concatenated data, and
      setting a source attachment individual identifier field of the second communication equal to the concatenated data; and
   sending the second communication to another node device.

18. The computer-readable storage device of claim 17, further comprising receiving the first communication from the first access device.

19. The computer-readable storage device of claim 17, wherein the sending comprises sending the second communication to a proxy device for a second access device, and wherein the second communication comprises an instruction to the second access device to create a pseudo-wire between the first access device and the second access device via the node device.

20. The computer-readable storage device of claim 19, wherein the pseudo-wire is associated with a single control plane.

* * * * *